(12) United States Patent
Amin et al.

(10) Patent No.: US 7,593,741 B1
(45) Date of Patent: Sep. 22, 2009

(54) SYSTEM AND METHOD FOR AUTOMATICALLY TRANSFERRING A CALL FROM A FIRST TELEPHONE TO A DESIGNATED TELEPHONE IN CLOSE PROXIMITY

(75) Inventors: Umesh J. Amin, Redmond, WA (US); Glenn Blumstein, Mercer Island, WA (US); David William Holmes, Redmond, WA (US); Hitesh Shah, Seattle, WA (US); Ketan Kamdar, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 11/617,392

(22) Filed: Dec. 28, 2006

Related U.S. Application Data (63) Continuation of application No. 09/467,712, filed on Dec. 20, 1999, now Pat. No. 7,171,221.

(51) Int. Cl.
*H04B 1/40* (2006.01)
(52) U.S. Cl. ............ 455/462; 455/41.2; 455/445; 379/211.02; 379/212.01
(58) Field of Classification Search ........... 455/462, 455/417, 428, 445, 41.2, 39; 379/211.01, 379/211.02, 212.01
See application file for complete search history.

(56) References Cited

U.S. PATENT DOCUMENTS

| | | |
|---|---|---|
| 4,757,267 A | 7/1988 | Riskin |
| 5,197,092 A | 3/1993 | Bamburak |
| 5,243,645 A | 9/1993 | Bissell et al. |
| 5,315,636 A | 5/1994 | Patel |
| 5,363,425 A | 11/1994 | Mufti et al. |
| 5,485,163 A | 1/1996 | Singer et al. |
| 5,579,375 A | 11/1996 | Ginter |
| 5,608,412 A | 3/1997 | Welles et al. |
| 5,675,629 A | 10/1997 | Raffel et al. |
| 5,724,417 A * | 3/1998 | Bartholomew et al. . 379/211.05 |
| 5,737,403 A | 4/1998 | Zave |
| 5,745,850 A | 4/1998 | Aldermeshian et al. |
| 5,889,845 A | 3/1999 | Staples et al. |
| 5,892,819 A | 4/1999 | Stumer |
| 5,926,761 A | 7/1999 | Reed et al. |

(Continued)

OTHER PUBLICATIONS

Author unknown, http://bluetooth.ericsson.se/default.asp, date unknown (1pg) Ericsson Bluetooth Core.

(Continued)

*Primary Examiner*—CongVan Tran
(74) *Attorney, Agent, or Firm*—Parks IP Law LLC; Jonathan A. Paulis (57) ABSTRACT

A system and method of automatically transferring a call between telephones based on the distance between the two telephones is provided. First the proximity of a first telephone to a second telephone is determined. If the proximity is within a predetermined limit or threshold, calls directed to the first telephone are transferred to the second telephone. Security of the transfer may be ensured to prevent fraudulent use of the subscription of either telephone. Procedures are provided which permit any the above-mentioned steps to be performed either at the level of the individual telephones involved in the transfer, or by an element of the network, such as an SC or HLR.

6 Claims, 8 Drawing Sheets

U.S. PATENT DOCUMENTS

| | | | |
|---|---|---|---|
| 5,928,325 A | | 7/1999 | Shaughnessy et al. |
| 5,983,100 A | * | 11/1999 | Johansson et al. ........ 455/426.1 |
| 6,061,343 A | * | 5/2000 | son Åkerberg .............. 370/345 |
| 6,078,581 A | | 6/2000 | Shtivelman et al. |
| 6,134,312 A | | 10/2000 | Peoples |
| 6,144,318 A | | 11/2000 | Hayashi et al. |
| 6,188,888 B1 | | 2/2001 | Bartle et al. |
| 6,195,545 B1 | | 2/2001 | Baker et al. |
| 6,233,448 B1 | | 5/2001 | Alperovich et al. |
| 6,236,868 B1 | | 5/2001 | Lygas |
| 6,304,757 B1 | | 10/2001 | Larsson |
| 6,332,082 B1 | | 12/2001 | Fuller et al. |
| 6,339,706 B1 | * | 1/2002 | Tillgren et al. .............. 455/419 |
| 6,362,778 B2 | | 3/2002 | Neher |
| 6,487,180 B1 | | 11/2002 | Borgstahl et al. |
| 6,560,466 B1 | * | 5/2003 | Skorko ........................ 455/567 |
| 6,580,904 B2 | | 6/2003 | Cox et al. |
| 6,999,769 B1 | * | 2/2006 | Henon ......................... 455/445 |
| 2007/0026904 A1 | * | 2/2007 | Matsuda .................. 455/569.2 |

OTHER PUBLICATIONS

Author unknown, http://bluetooth.ericsson.se/ebc/default.asp, date unknown (1pg) Ericsson Bluetooth Core/The concept beco.

Author unknown, http://bluetooth.ericsson.se/ebc/implementation.asp, date unknown (1 pg) Ericsson Bluetooth Core/The natural evolution in wireless technology.

Author unknown, http://bluetooth.ericsson.se/ebc/roadmap.asp, date unknown (1pg) Ericsson Bluetooth Core/Moving toward a single chip solution.

Author unknown, http://bluetooth.ericsson.se/ebc/components.asp, date unknown (1pg) Ericsson Bluetooth Core/Presenting the first complete solution for bluetooth applications.

Author unknown, http://www.ericsson.se//microe/bluetooth.html, date unknown (1pg) Microelectronics Bluetooth Products/Bluetooth Wireless Connectivity.

Author unknown, http://www.digianswer.com/tech_overview1.asp, date unknown (1pg) Digianswer—Bluetooth Overview.

Author unknown, http://bluetooth.net/prod_list.asp, date unknown (1pg) Digianswer—Bluetooth Products/Digianswer Bluetooth Products and Services.

Author unknown, http://www.bluetooth.net/tech_list.asp, date unknown (1pg) Digianswer—Bluetooth Technology.

Author unknown, http://www.bluetooth.net/ex_view.asp?P_exampleID=3, date unknown (1pg) Digianswer/the handsfree car kit.

Author unknown, http://www.bluetooth.net/prod_ex_view.asp?P_exampleID=16, date unknown (1pg) Digianswer/Bluetooth Integration.

Author unknown, http://www.futurefonzone.com/whitepaper.htm, date unknown, pp. 20 & 21.

Author unknown, http://www.globile.com/bluetooth.asp, date unknown (1pg) News & Articles, Codename: Bluetooth, The Wireless Connectivity Revolution is Here.

Author unknown, http://www.mobilebluetooth.com/whatisbt.htm, date unknown, pp. 1 & 2 What is Bluetooth?.

Author unknown, http://www.bluetooth.com/faq/default.asp, date unknown (2 pp) Bluetooth—FAQ, General.

Author unknown, http://www.bluetooth.com/document/default.asp?page=overview, date unknown, pp. 1-4 Bluetooth—Document Page, Technology Overview.

Author unknown, http://bluetooth.com/document/default.asp?page=dspecification, date unknown, pp. 1 & 2 Bluetooth—Document Page/Specification of the Bluetooth System—Core.

Author unknown, http://www.bluetooth.com/usersituation/default.asp?page=threeino, date unknown (1pg) Bluetooth—Usersituations, Use the same phone wherever you are.

Decker, Peter; Bluetooth SIG Automotive Workgroup MRD, Bluetooth Doc. No. 8.C999/0.8.0xxxxx, Dec. 3, 1999, pp. 1-16.

* cited by examiner

SYSTEM AND METHOD FOR AUTOMATICALLY TRANSFERRING A CALL FROM A FIRST TELEPHONE TO A DESIGNATED TELEPHONE IN CLOSE PROXIMITY

CROSS-REFERENCE TO RELATED APPLICATIONS

This application is a continuation of application Ser. No. 09/467,712, filed Dec. 20, 1999 now U.S. Pat. No. 7,171,221.

BACKGROUND OF THE INVENTION

This invention relates generally to telecommunications and, more particularly, to a system and method of automatically transferring a call from a first telephone to a second telephone when the second telephone is in the proximity of the first telephone.

Call forwarding is a common feature in both landline and wireless telephone systems. Conventionally, a user programs a telephone to ring at another telephone, either unconditionally, or in the event that there is no answer at the programmed telephone. Typically, a user must take the time to program the feature every time call forwarding is desired.

Many telephone users have multiple telephones with separate telephone numbers. Users may have landline telephones at work and home. Users may also have portable telephones, which are carried on or near a user's person, and may have mobile telephones mounted in automobiles. Typically, in such circumstances a user has a preference as to which telephone they would rather use. Some users might prefer to take cellular calls on a landline telephone, because of the cost savings, when they are near their landline telephones. Other users might prefer to take all their calls on a cellular telephone for convenience. Some users might prefer to take calls to their portable telephone on a mobile telephone, when in an automobile, because of the higher performance associated with mobile telephones.

However, it is difficult for a communication network to determine a user's preferences, especially when the preferences are dependent on the user's location and personal circumstances. It is also difficult for a user to remember to consistently enter call transferring instructions. Further the process of constantly changing the call transferring program can be tiresome.

It would be advantageous if telephone calls could be automatically transferred from a first telephone to a designated telephone, when the first telephone is near the designated telephone. Further, it would be advantageous if such automatic transfer from the first telephone could be automatically nullified when the first telephone is no longer near the designated telephone.

SUMMARY OF THE INVENTION

Accordingly, a method for automatically transferring telephone calls between telephones in communication through one or more networks has been provided. According to the method proximity of a first telephone to a designated telephone is determined, transfer of a call from the first telephone through the one or more networks to the designated telephone is initiated in response to the proximity, the transfer is authorized, and the call is accepted on the designated telephone.

"Proximity" is used broadly in this summary and in the description to follow. Telephones are "proximate" when they are near or adjacent to each other. Nearness may mean a measurement of distance between a moving telephone and a fixed one, or it may entail measurement of distance between two moving telephones. The term proximity can also signify the intersection of areas or volumes that contain the telephones.

Further, transfer of calls from the first to the preferred telephone is by means of a network that may be a single net or two or more nets in communications. Accordingly, the telephones are in communication, or are enabled to communicate by means of one or more networks.

Proximity of the two telephones can be determined in a number of ways. In one aspect of the invention proximity may be determined using wireless location receivers, such as global positioning satellite (GPS) receivers. In another aspect, wireless network elements may determine the telephone locations from position triangulation. When one of the telephones has a fixed location, the position of a portable or mobile telephone can be compared to the fixed position for determining proximity. Alternatively, two wireless telephones may have short-range wireless transceivers, such as those based on Bluetooth technology, which may give an indication of proximity as a relative measure not referenced to a fixed location. Then, the exact location of the telephones need not be determined, it must just be determined that the telephones are near each other.

Telephone proximity is determined through data collected by the telephones themselves or by other means in communication with the telephones, such as a network, or by a combination of the two. Before initialization of call transfer commences, an analysis must be made of position and/or proximity data. The decision that telephones are close enough to begin the transfer can be made by the designated telephone, by the first telephone, by a process involving both telephones, or by the telephones in combination with the network. In some aspects of the invention, the network may establish a positioning node at a mobile switching center (MSC) to calculate proximity between telephones.

Call transfer is initiated after it is determined that the telephones are in proximity. The decision to transfer the call can be made by logic embedded in the designated telephone, in the first telephone, or in a process involving both telephones. In some aspects of the invention the decision to transfer the call is made by the network (MSC), or a decision process involving both the telephones and a network element.

In some aspects of the invention the initiation of the call transfer is made by either the first telephone or the designated telephone, with the entering of a code after a determination has been made that the telephones are in close proximity. Alternately, the call transfer is enabled by simply turning on the designated telephone, or turning off the first telephone.

The call transfer can also be automatically nullified in response to predetermined conditions such as the elapse of a predetermined amount of time, the termination of a call, low power battery in the designated telephone, or poor RF coverage of the designated telephone.

In some aspects of the invention security features may be added, with authorization being precedent to call transfer. Such authorization can involve the matching of telephone serial numbers in a database of permitted transfers. The database can be maintained by the network or in a telephone. Alternately, the telephone user can enter a personal identification number (PIN) into the first telephone, the designated telephone, or into both telephones. Further, the authorization may be dependent on factors such as the power supply or radio frequency (RF) coverage of the transferring telephones.

A typical scenario might include the transfer of calls to a portable telephone from a mobile telephone mounted in an automobile, when the portable telephone is in, or near, the automobile. Likewise, calls can automatically be transferred to a portable telephone when the user is in close proximity to a known fixed site. Calls can be automatically transferred from a portable telephone to a mobile telephone, or landline telephone, when the user is in an automobile, or at the site of a landline telephone.

A system for transferring calls between telephones is also provided. The system comprises at least a first telephone and a designated telephone in a communication with the first telephone. When the first telephone has a determined proximity to the designated telephone, calls received at the first telephone are transferred to the designated telephone, in response to such proximity.

In some aspects of the invention a network positioning node (PN) receives information regarding telephone proximity and supplies the proximity determination. Proximity information can also be collected by either the telephones themselves using location receivers, or by using time of arrival measurements. Such tracking of the telephone may be as necessary for a proximity determination can be performed by the telephones themselves, or by a network. Likewise the decision on whether the telephones are in proximity can be made by the network MSC or by one, or both, of the telephones.

DETAILED DESCRIPTION OF THE PREFERRED EMBODIMENT

The essence of this invention is to transfer a call, or other communication, from a first telephone, to a designated telephone in proximity to the first telephone. Such a transfer requires determination of the proximity of the first and designated telephones and also requires means to effect and transfer the communication.

Figure 1:
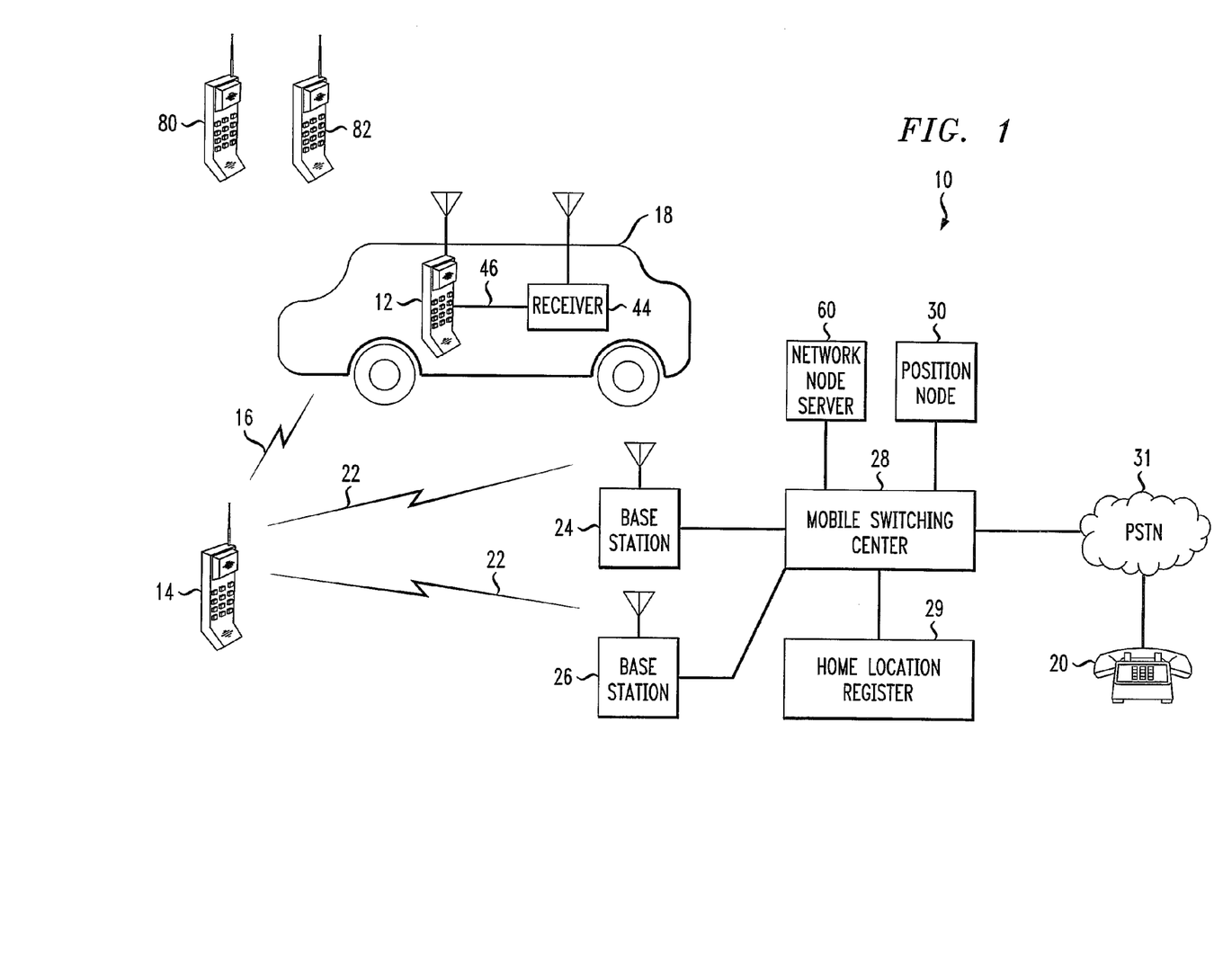
FIG. 1 is a schematic block diagram of a system according to this invention for transferring calls.

FIG. 1 is a schematic block diagram that illustrates an embodiment of the present invention system for transferring calls. This example is for illustration only and is not meant to limit the scope of the invention. A wireless communications network 10 is shown comprising a first telephone 12 connected to the communications network 10. A second telephone 14 is connected to the communications network 10 and has a proximity to the first telephone 12. The proximity between first telephone 12 and second telephone 14 is represented by an arrow or vector 16. The second telephone 14 selectively receives calls, transferred from the first telephone 12, in response to the proximity of the first and second telephones and 12 and 14.

For illustration, at least one of the telephones 12 and 14 is a wireless telephone. In some aspects of the invention, the first telephone 12 is a wireless telephone mounted on a mobile platform, such as automobile 18, and the second telephone 14 is a portable wireless telephone. This is the configuration shown in FIG. 1. Alternately, but not shown, the second telephone is mounted in automobile 18, and the first telephone is portable telephone 12.

In another application of the invention, the first telephone 12 may be a portable wireless telephone, and the second telephone 20 may have a predetermined fixed location such as the telephone 20, which may be a conventional landline telephone in a home or office. Alternately, the landline telephone 20 may be the first telephone and the second telephone may be the portable telephone 12. The position of the landline telephone 20 can be entered into telephone logic or stored in a network database so that the proximity of telephone 12 to telephone 20 can be determined by tracking telephone 12.

The invention contemplates a number of mechanisms to track the position of mobile telephones. The network 10 includes a plurality of base stations connected to the first and second telephones 12 and 14 through wireless communications links 22. Base stations 24 and 26 are specifically shown in FIG. 1. The network also includes a mobile switching center (MSC) 28. In some aspects of the invention, the network 10 includes a home location register (HLR) 29 and network positioning node (PN) 30 having a port connected to the communications network 10 to receive information regarding the position of the first and second telephones 12 and 14. The PN 30 analyzes the position information and supplies a proximity determination. The landline telephone 20 is connected to network 10 through public switched telephone network (PSTN) 31.

The determination of proximity between telephones may be embodied in a threshold distance measurement that is based on several features including the potential accuracy of the information that is available on a position of both the mobile telephone 12 and the portable telephone 14, and other network factors, such as congestion in the cellular to be served. That is, even if telephones 12 and 14 are physically close, service may be limited due to lack of network capacity to effect the transfer.

The proximity determination may also involve the plurality of base stations, including stations 24 and 26, and arrival times of communications from the first and second telephones 12 and 14. The base stations 24 and 26 may supply the time-of-arrival data through a network connection to PN 30. In this case, PN 30 performs the proximity determination using the time-of-arrival (TOA) measurements on each other, and on communication base stations 24 and 26. Further, all the communicating elements 12, 14, 24, and 26 may make TOA measurements with which a proximity determination may be performed.

Figure 2:
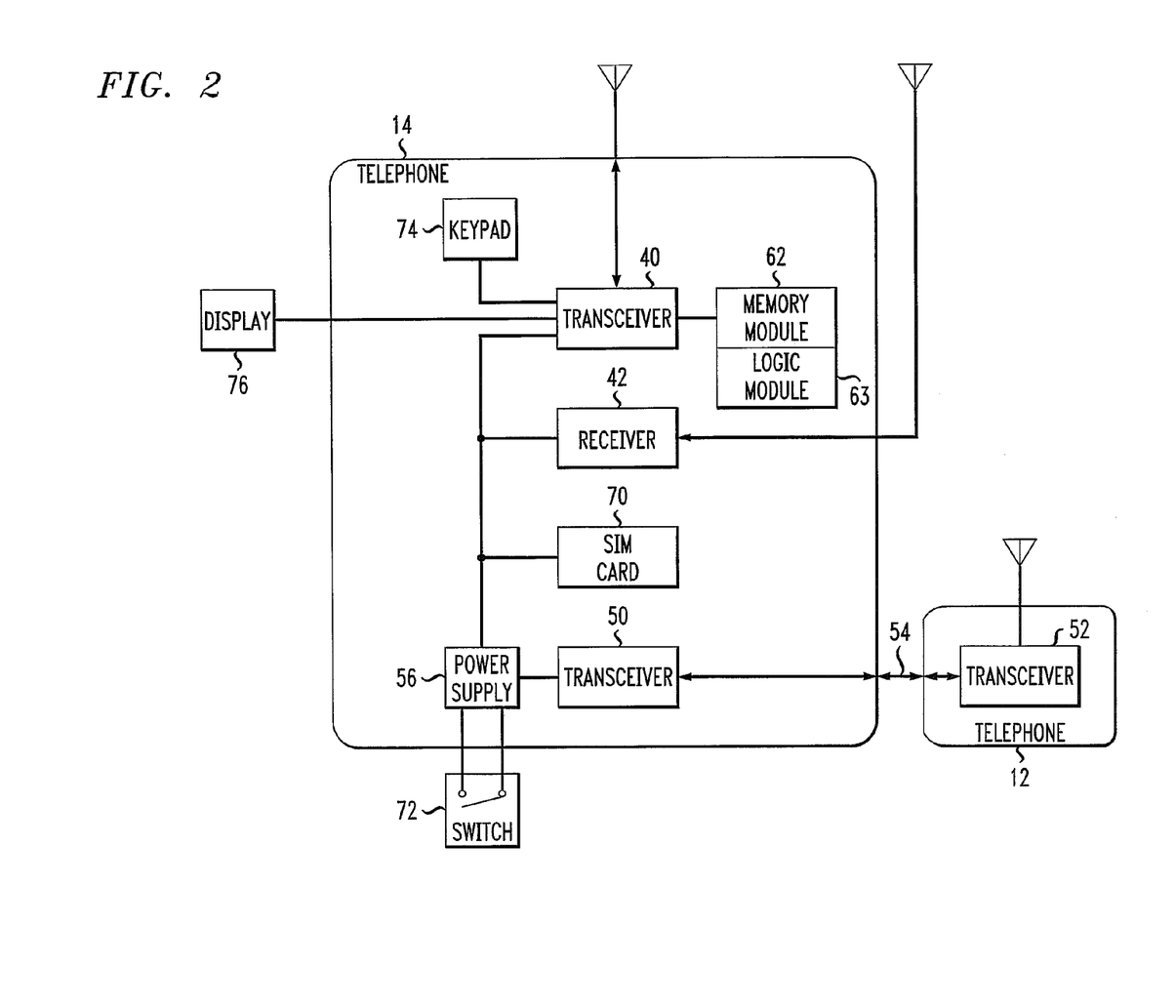
FIG. 2 is a more detailed block diagram schematic of a first telephone in the system of FIG. 1.

FIG. 2 is a more detailed block diagram schematic of the second telephone 14 of FIG. 1. The second telephone 14 is depicted as a wireless telephone with a wireless band transceiver 40 for communications with the network 10. As is well understood in the art, communications with the network 10 involve in-band communications, which are the voice or data information transfers that are the purpose of telephone calls, and out-of-band control signals which monitor and maintain network links between individual telephones and the network. One purpose of the present invention is to transfer in-band messages between telephones. The mechanics of communicating with the telephones and network to effect the transfers are typically carried out using the control channels. However, in some aspects of the invention the call transfer process concerns transferring the out-of-band control signals of a first telephone to a second telephone. A "call" can be defined to include the registration of the telephones 12 and 14 with the network, typically with a home location register (HLR). In other words, the communication which is actually transferred is the normal location tracking, or the normal subscription tracking that is performed by the network 10.

Assuming that the proximity determination returns a judgment that threshold conditions have been satisfied, MSC 28 or PN 30 initiates network commands to perform a transfer of a call directed to the first telephone 12 to the second telephone 14. In this regard, a message is sent, such as a page from the MSC 28 to the portable unit 14, which will cause the mobile unit 12 to ring and then, either automatically or as a result of intervention by the user, the call is answered. A traffic channel is set up between the portable telephone 14 and MSC 28, and communications are now directed to telephone 14, instead of mobile telephone 12. The MSC 28 then sends a message to the mobile telephone 12 instructing it to clear the traffic channel and terminate the call or other communication.

The second telephone 14 depicted in FIG. 2 includes a wireless location receiver 42 selected from the group consisting of global positioning satellite (GPS) systems and short-range positioning beacon systems, or similar navigational systems. FM radio and LORAN position systems are examples of short-range positioning beacon systems. The wireless receiver 42 permits the second telephone 14 to establish its position independently of communications with the network 10. However, when the second telephone 14 uses a CA code GPS receiver 42, the MSC 28, or some other element in the network, may send differential correction data to improve the accuracy of the position measurements. The second telephone 14 supplies wireless receiver location data to the PN 30, and the PN 30 makes the proximity determination in response the received wireless location data. Likewise, but not shown, the first telephone 12 has a wireless location receiver and sends position data to PN 30.

Returning to FIG. 1, in some aspects of the invention of the mobile platform 18 includes a wireless location receiver 44 having an output port to supply position data. In this aspect, the second telephone 14 has a port to accept the position data from the automobile wireless location receiver 44 on line 46.

The system of the present invention need not use PN 30 to perform the proximity determination. In some aspects of the invention the second telephone 14 collects information regarding the position of itself to the first telephone 12, and the second telephone 14 performs the proximity determination based on the collected position information. This proximity determination is performed by the second telephone 14 using the time-of-arrival data measured by base stations 24 and 26, and/or the telephones 12 and 14. Likewise, in some aspects of the invention the first telephone 12 accepts the time-of-arrival data and performs a proximity determination either independently, or in concert with the second telephone 14. Alternately, the second telephone 14 (and/or first telephone 12) makes a proximity determination from embedded wireless location receivers such as receivers 42 (see FIG. 2) and 44. In some aspects of the invention, telephones 12 and 14 work in concert with PN 30 or MSC 28 to make a determination of proximity.

In another aspect of the invention the absolute position of neither the first telephone 12 nor the second telephone 14 may be known. First and second telephones 12 and 14 may establish contact with each other outside of the communication network 10 in order to make the proximity determination. For this purpose, short-range transceivers 50 and 52, using Bluetooth, infra-red, Home RF, wireless LAN technologies, or even a second wireless transceiver, permit communications when the telephones 12 and 14 are in close proximity. Then, the second telephone 14 makes the proximity determination in response to short-range transceiver communications 54 between the first and second telephones. In this aspect of the invention, the proximity determination is based on the clarity or signal strength of the short-range communications link. Alternately, the proximity determination may be made by the first telephone 12, or made mutually by the two telephones 12 and 14.

Moreover, the short-range transceivers 50 and 52 can also be used to communicate absolute positions between the telephones 12 and 14, where the telephones 12 and 14 are equipped with wireless navigation receivers, or are otherwise supplied with positional data, independent from the network 10. Then, the proximity determination is made based on position, not merely the relative distance between the two telephones 12 and 14. For example, the second telephone 14 may collect the GPS position of the first telephone 12 through the use of short-range transceivers 50 and 52.

Just as the proximity determination can be made by either of the telephones, the network, or both, the call transfer process can be effected at a number of different levels or locations in the network 10. Returning to FIG. 1, in one aspect of the invention the MSC 28 is connected to the communications network 10 to accept the proximity determination. The MSC 28 initiates a call transfer from the first telephone 12 to the second telephone 14 in response to the proximity determination.

Returning briefly to FIG. 2, the second telephone 14 has a power supply or battery 56 to enable portable telephone operation. The second telephone 14 reports the condition of the power supply 56 to the network 10. Likewise, but not shown, the first telephone 12 can have a battery power supply which is monitored and reported. The MSC 28 receives reports on the condition of telephone power supplies, such as power supply 56, along with other factors, such as the radio frequency (RF) coverage currently enjoyed by first and second telephones 12 and 14. The MSC 28 nullifies the call transfer, from first telephone 12 to the second telephone 14, in response to a stimulus selected from the group consisting of the condition of the first telephone power supply 56, based on a concern that a low power supply voltage may cause communications to the second telephone 14 to fail. Nullification of the call transfer means that calls addressed to the first telephone 12 are sent by the network 10 to the first telephone 12. Further, transfer can be nullified based on the elapse of time since the call transfer was completed, the termination of a specific transferred call to the second telephone, the condition of the first telephone power supply, or the RF coverage of the first and second telephones 12 and 14. Once again, a determination may be made to nullify a transfer based on the concern that the RF communication link to the second telephone 14 is poor, while the RF coverage of the first telephone 12 is good.

In addition to nullifying an existing call transfer, the MSC 28 has the authority to initially establish a call transfer in response to conditions such as of the status of the second telephone power supply 56, and/or the status of the first telephone power supply (not shown). For example, when the first telephone 12 is mounted in the automobile 18, the call transfer process may be triggered by the detection of the automobile being shut off, or the detection of a weak automobile battery. As with nullification, the call transfer process is initially established in consideration of factors such as the RF coverage of first and second telephones 12 and 14, and the wireless cellular capacity, in some aspects of the invention.

In some aspects of the invention the first and second telephones 12 and 14 may have non-transferable identification numbers, or serial numbers. A database of cross-referenced identification numbers may be maintained by the communications network 10 to provide cross-referenced reports. The MSC 28 accepts cross-referenced identification numbers from this database, and authorizes the initiation of the call transfer in response to the cross-referencing reports. Returning to FIG. 1, a network node server 60 is shown connected to network 10. The identification number database is potentially housed in a variety of elements including memory modules 62 embedded in the second telephone 14 (see FIG. 2), the first telephone 12 (not shown), or the network node server 60.

The decision to initiate a call transfer can also come from a telephone participating in the call transfer process. Returning to FIG. 2, the second telephone 14 further includes a logic module 63 to accept the proximity determination and other factors in consideration of a call transfer. The second telephone logic module 63 initiates a call transfer from the first telephone to the second telephone in response to the proximity determination. Likewise, the first telephone 12 and includes a logic module (not shown) to initiate a call transfer in some aspects of the invention. In some aspects of the invention, that call transfer is initiated after an agreement is reached between the first telephone 12 and the second telephone 14. In another alternative, the decision process involves the telephones 12 and 14, along with MSC 28.

In a simple aspect of the invention, the second telephone 14 initiates the call transfer by registering a star feature code with the network, following a proximity determination. The positional information, proximity determination, and decision to initiate the call transfer process can be performed through any of the above-described methods.

Likewise, the first telephone 12, or both telephones 12 and 14 may enter star codes to initialize the call transfer in some aspects. This feature permits a call already in progress to be transferred by the generation of a message such as the common call transfer message using a star feature code. This message would also include the mobile telephone 12 identification as used by the system 10, such as a dialable number, IMSI, or TMSI etc. to identify the portable telephone 14.

Returning briefly to FIG. 2, in some aspects of the invention a SIM card 70 may be implemented to identify the user of a telephone, and the second telephone 14 initiates the call by transfer of the SIM card 70, from the first telephone 12, to the second telephone 14. The SIM card subscription identification module 70, which is used in global system mobile (GSM) telephones, is commonly transferred between various telephones. Indeed, it was the original intent of the design of the SIM card that the subscription and communication of a mobile to home location register of a mobile would be enabled from one physical transceiver to another by movement of the SIM card. The unique aspect of the use of the SIM card 70 is the ability of the present invention system to transfer a pre-existing call from one telephone to another. Naturally, in this particular circumstance a threshold proximity determination is presumed since the first telephone 12 will not operate indefinitely before the SIM card 70 is inserted into another telephone. Insertion of the SIM card 70 causes the registration of that telephone with network 10, typically with the HLR. On seeing the new registration, the home location register generates a new paging message by the serving MSC 28. In some aspects of the invention the call in progress to the first telephone 12 is put on hold as the SIM card is inserted into the second telephone 14, and the second telephone 14 registers with the system.

In some aspects of the invention, the second telephone 14 includes a switch 72 to selectably enable the second telephone 14, and the second telephone 14 initiates the call transfer in response to enabling the switch 72. Alternately, the second telephone 14 includes a keypad 74, as shown, or a key reading mechanism (not shown). Then, the second telephone 14, or first telephone 12 (or both) authorizes the initiation of the call transfer by registering a private code with network 10.

As with MSC 28, the second telephone 14 can nullify a call transfer in response to a stimulus selected from the group consisting of condition of the first telephone power supply 56, the elapse of time since the call transfer was completed, the termination of a transferred call to said first telephone, and the RF coverage enjoyed by the telephones 12 and 14, and the power supply status of the telephone 12. Likewise, the first telephone 12, or the telephones 12 and 14 working in concert, can be configured to nullify call transfers. As with the MSC 28, the second telephone 14 can accept cross-referenced identification numbers from said database in the network, or stored on the telephone 12 or the telephone 14, to authorize the initiation of the call transfer in response to the cross-referencing reports. Likewise, the first telephone 12 can also be so enabled.

An initiated transfer can be withheld until some means of authenticating the user is provided. For example, the entry of a personal identification number or PIN onto one or both of the transferring telephones 12 and 14. This authentication of the user using the PIN could be performed either autonomously by the logic within the transceivers, the PIN being prestored therein but not readable. Alternatively, and obviously in the case of network based transfers, the PIN can be stored by the network 10. Such a PIN-based transfer verification would also require that either unit 12 or 14 be given the option to approve or disapprove the transfer.

In some aspects of the invention the first telephone 12, the second telephone 14, or both telephones 12 and 14, authorize the initiation of the call transfer in response to factors such as the condition of the second telephone power supply 56, the status the power supply of the first telephone 12, the RF coverage of telephones 12 and 14, and the capacity of the wireless cellular.

In some aspects of the invention the second telephone 14, or first telephone 12 may include a presentation mechanism 76, such as a display, as shown, or an audio speaker or tactile interface (not shown). The presentation mechanism 76 presents the results of the call initiation process to the user of the telephone. Likewise, the first telephone 12 may be equipped with a display, or the like, to signal the successful initiation of the call transfer.

Returning to FIG. 1, in some aspects of the invention a plurality of telephones in addition to the telephones 12 and 14 are included, such as the telephones 80 and 82, each having a proximity to the first telephone 12. A hierarchical transfer priority is established, either in the telephone logic, or with the network HLR or PN 30, between the plurality of telephones 14, 80 and 82. A hierarchy represents a list of telephones to which calls may be transferred in order of preference. Then, a call transfer is initiated to a telephone among the group 14, 80 and 82, which is in the proximity, with the higher transfer priority. For example, the mobile telephone 12 could contain a list of numbers of the mobile station identifications (MSID)s or dialable numbers of the hand held units 14, 80, and 82, and would progressively work through a list by trying to make transfers to each one of the portable units in turn. Only on completion of successful transfer indication would the sequence of transfer attempts cease.

It should be noted that for the sake of simplicity and clarity, the above-mentioned system has generally described the transfer of a call from the first telephone 12, to the second telephone 14. However, processes and system elements of the present invention also operate to transfer calls from the second telephone 14, to the first telephone 12, in a similar manner.

Figure 3:
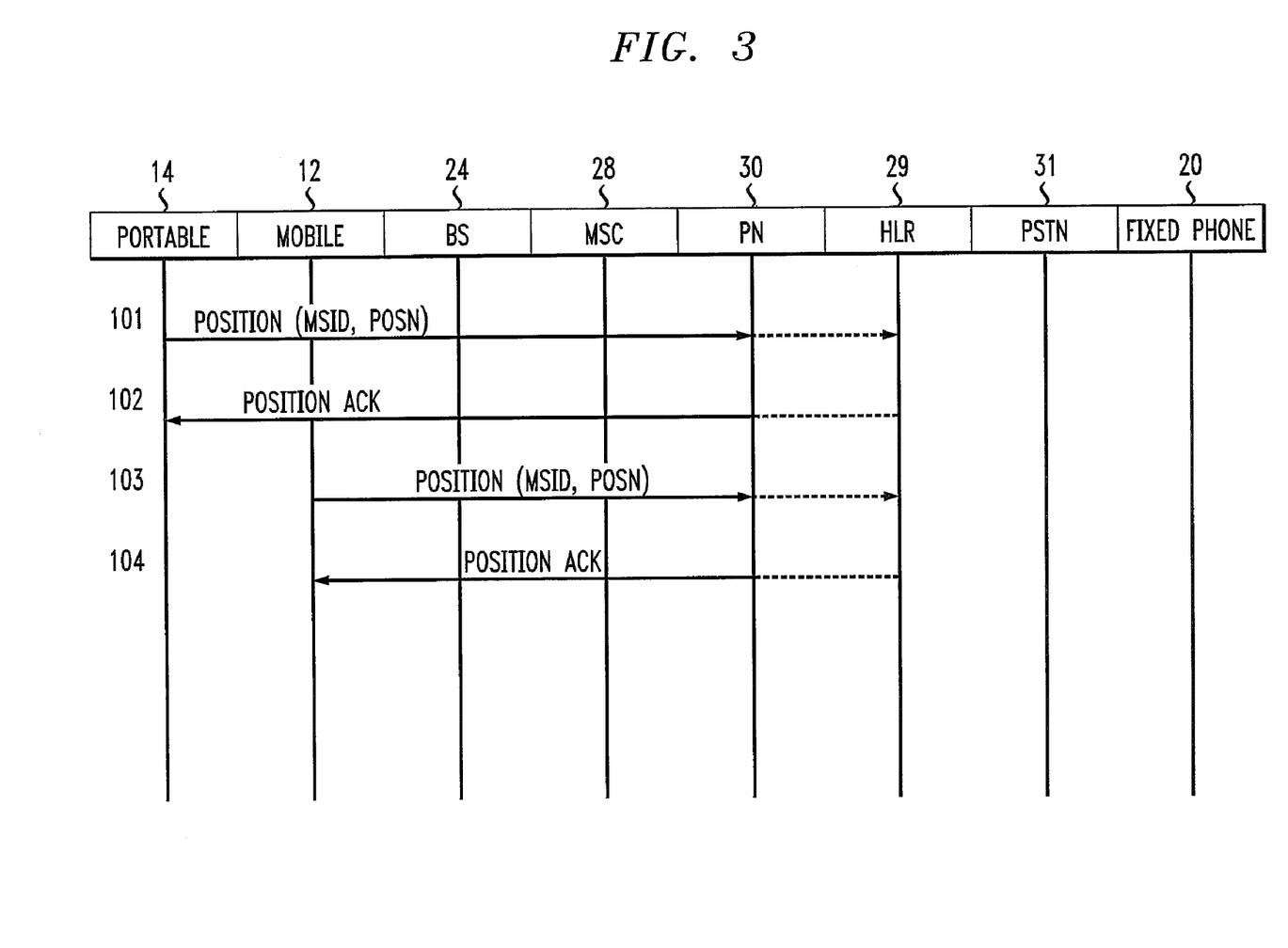
FIGS. 3-5 are charts illustrating an exemplary series of network communications where elements in the network participate in the call transfer process of this invention.
Figure 4:
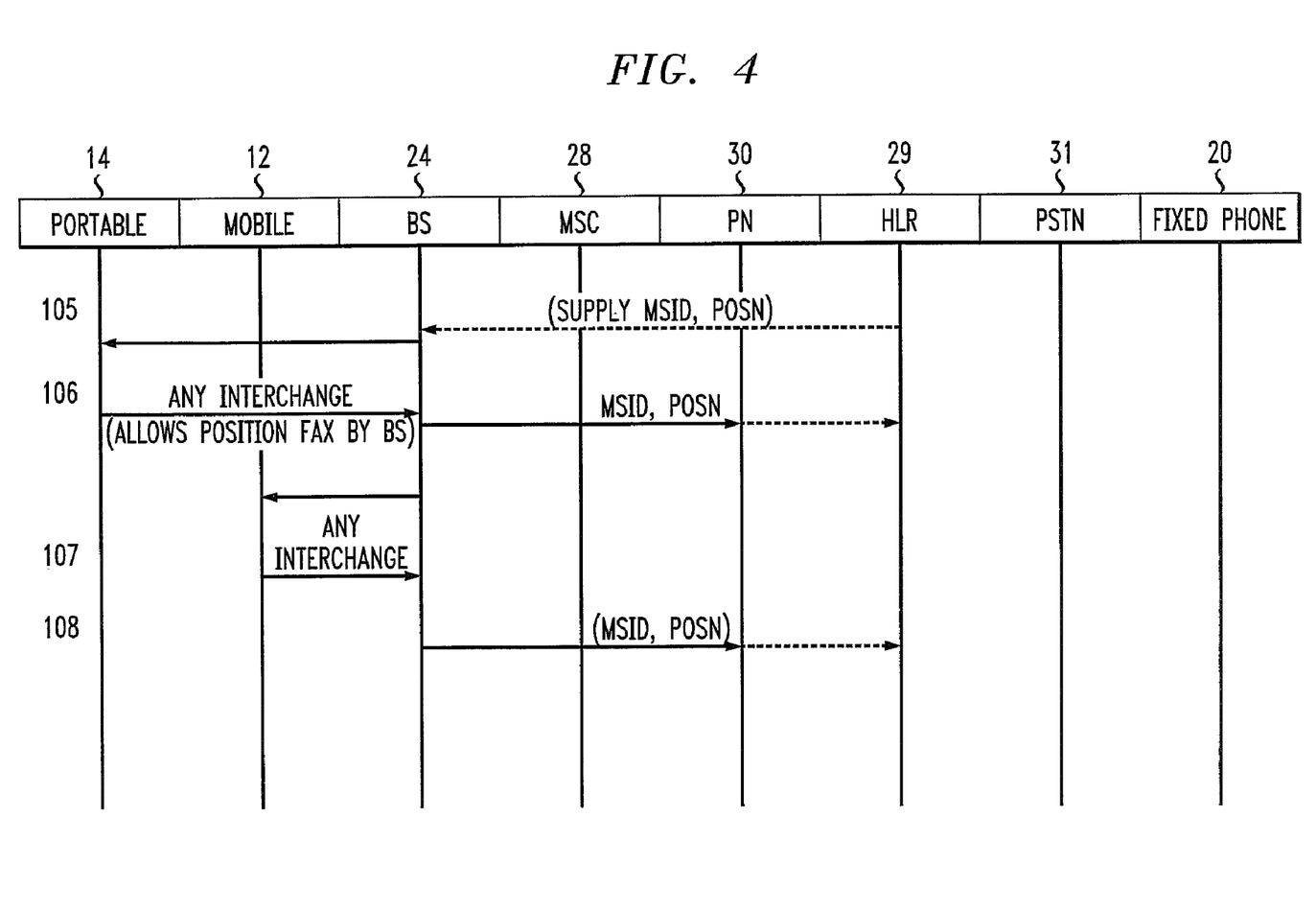
Figure 5:
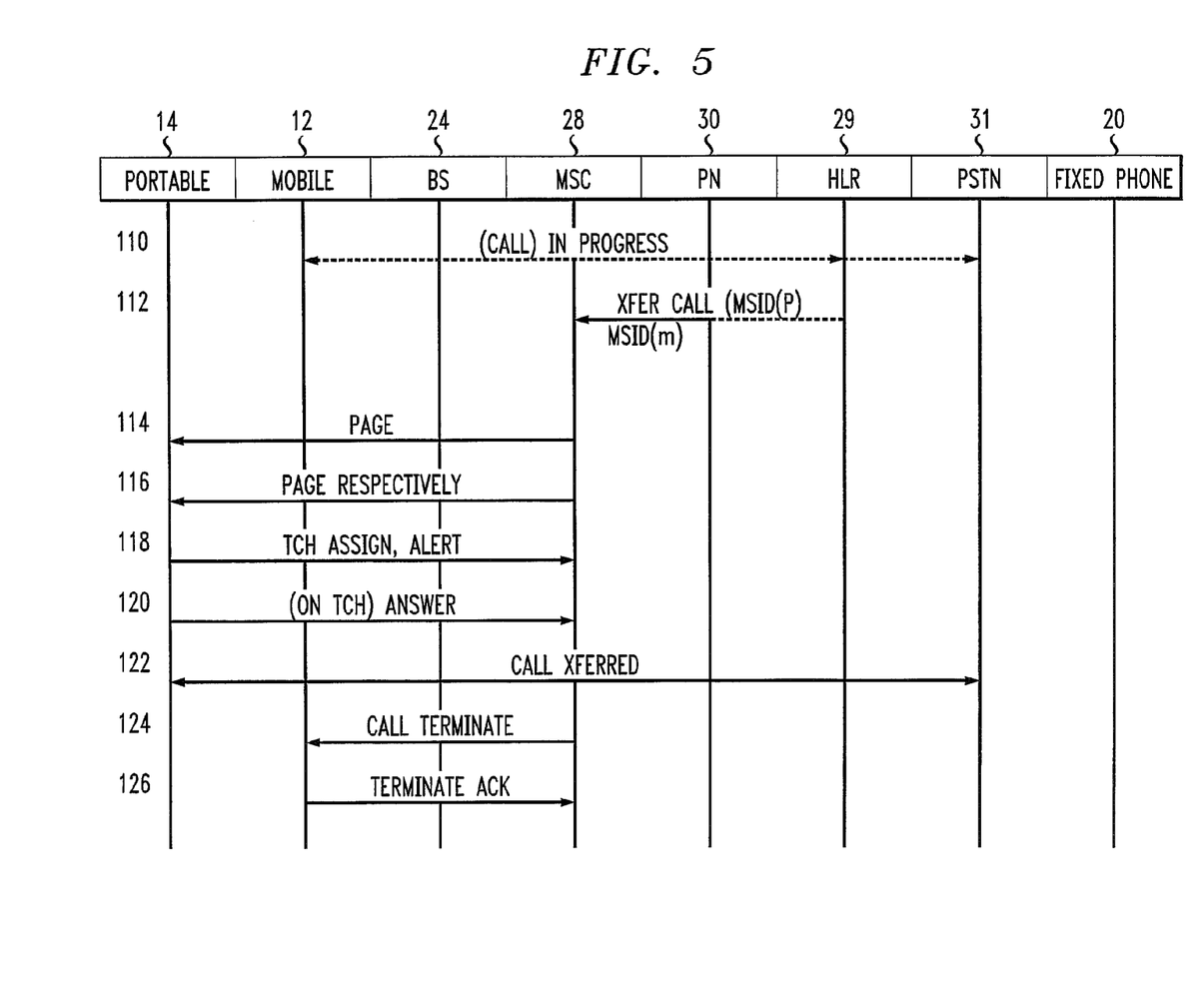

FIGS. 3-5 are charts illustrating an exemplary series of network communications where elements in the network initiate the call transfer process of the present invention. In lines 101 and 103, positional or proximity information is sent from telephones 14 and 12, respectively, to network elements PN 30 and HLR 29. This information may be sent at any time while telephones 12 and 14 are registered with network 10. The frequency of position updates is typically dependent on the rate of position change. In lines 102 and 104 the network sends acknowledgment signals of the position updates.

In FIG. 4, lines 105 and 106 illustrate a request by network nodes for positional information from the telephones 14 and 12, respectively. The requests are delivered through base station 24. Alternately, the request is originated by base station 24. Position information is shown being returned in lines 106 and 108. Any kind of message interchange can be used to determine the positions of telephones 12 and 14.

In FIG. 5, either an in-band or out-of-band call, including an ongoing registration process with HLR 29, is in progress on line 110. After a determination that telephone 14 is in proximity to telephone 12, an instruction is sent to initiate the call transfer in line 112. On line 114, the MSC 28 pages telephone 14, and receives an acknowledgement at line 116. A traffic channel is assigned to telephone 14 in lines 118 and 120. The call is transferred to telephone 14 in line 122, while the call is cleared to the first telephone in lines 124 and 126.

Figure 6:
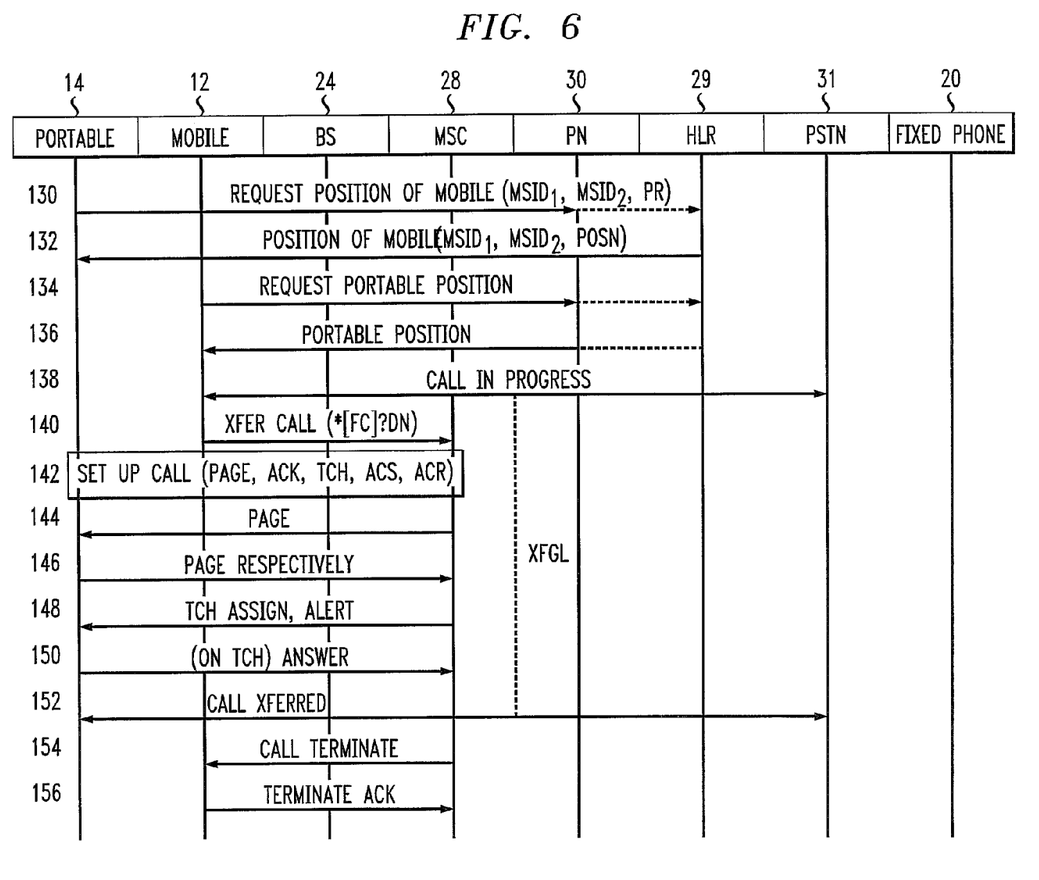
FIG. 6 is a chart illustrating an exemplary series of network communications for determining proximity between telephones.

FIG. 6 is a chart illustrating an exemplary series of network communications where the telephones 12 and 14 determine proximity. Lines 130 through 136 depict mobile telephones 14 and 12 requesting position updates. In line 138 a call is in progress between mobile telephone 12 and landline telephone 20. In line 140, the mobile telephone 12 has determined that the portable telephone 14 is close enough to transfer the call to it. In line 142 a normal call transfer series of messages are portrayed where the mobile telephone 12 supplies a star code, and the telephone number of telephone 14. At lines 144 through 150, the MSC 28 sets up the call to portable telephone 14. At line 152 the call is transferred to telephone 14, and in line 156 the path and call to telephone 14 is cleared.

Figure 7:
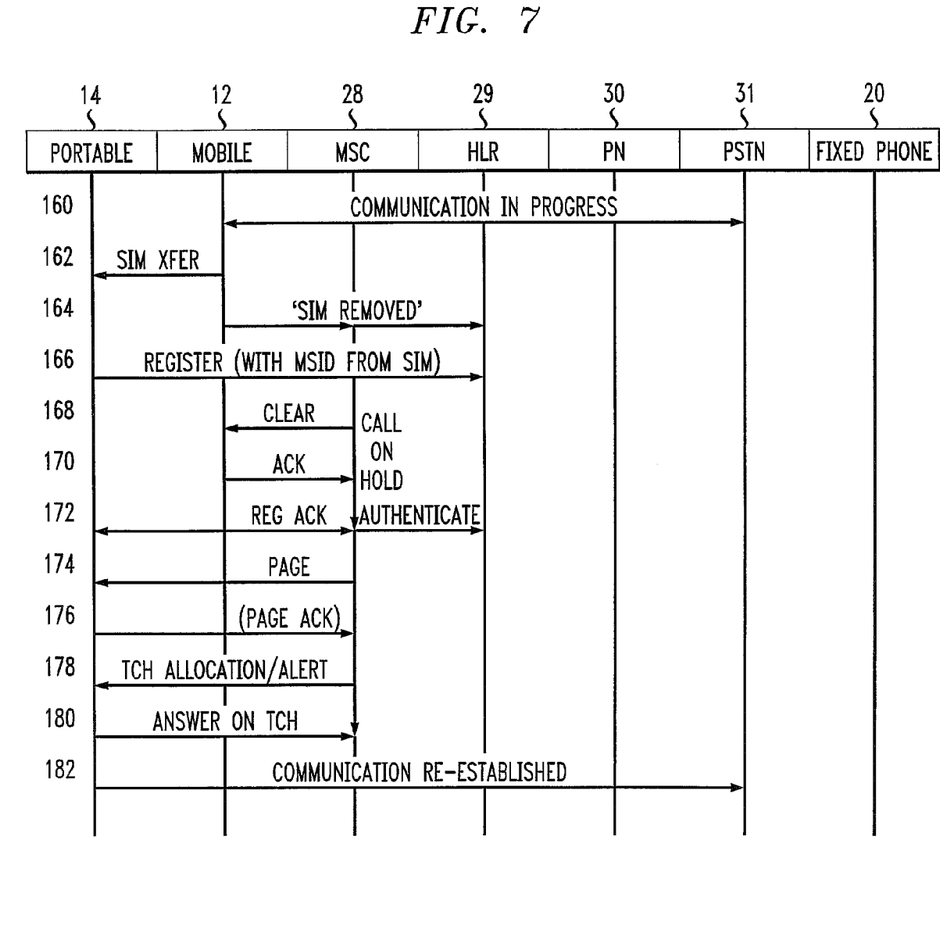
FIG. 7 illustrates a call transfer according to this invention using a SIM card.

FIG. 7 illustrates a call transfer of the present invention using a SIM card. At line 160 a connection to PSTN 31 is established with mobile telephone 12. Line 162 represents the removal of the SIM card from telephone 12, and insertion into the telephone 14. At line 162 the telephone 12 signals the SIM card removal. The MSC 28 puts the call on hold. At line 166 the telephone 14 registers with the HLR 29. Lines 168 and 170 represent the clearing of the line between mobile telephone 12 and the MSC 28. If required, MSID information may have timed-out in the mobile clearing the call. At line 172 the portable telephone 14 receives registration acknowledgement and authenticates the transfer process. In lines 174 through 182 the MSC 28 recognizes the call on hold for MSID. The MSC 28 sets up the call to portable telephone 14 through standard procedures.

Figure 8:
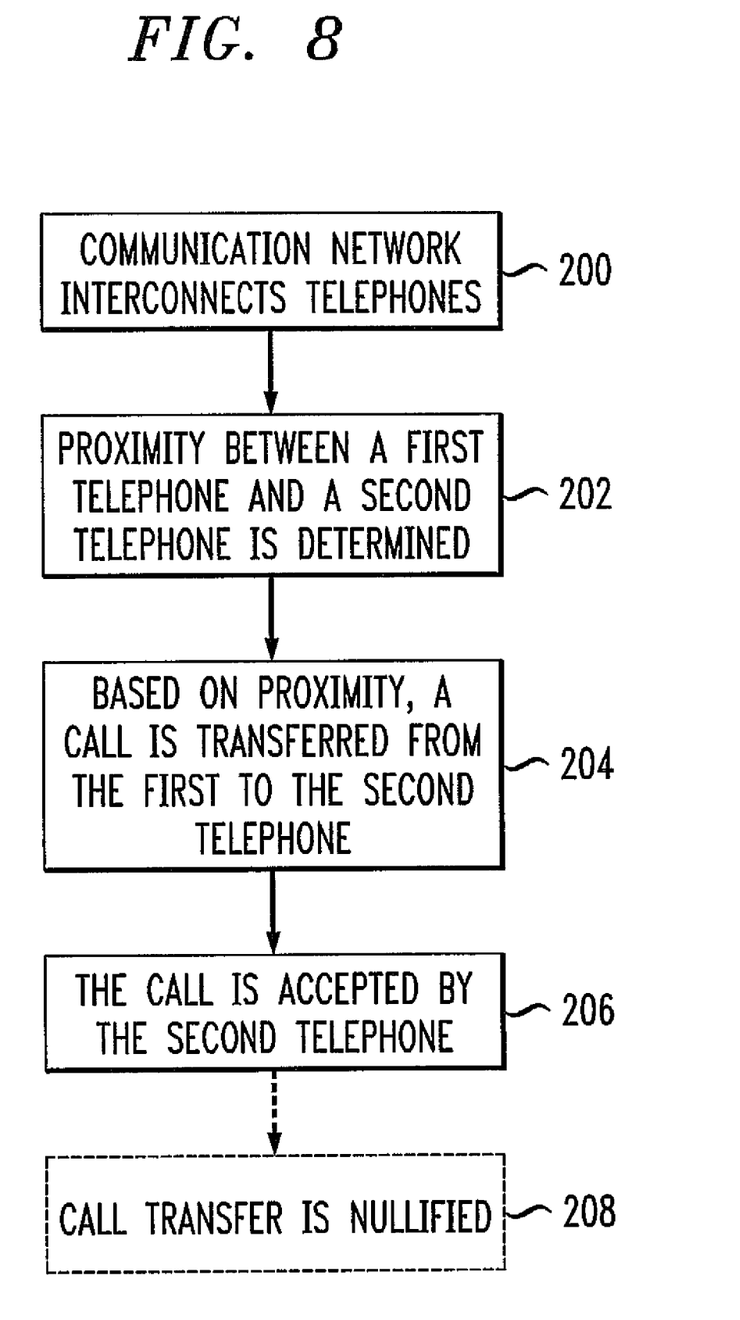
FIG. 8 is a flowchart illustrating steps in the present invention method for transferring telephone calls.

FIG. 8 is a flowchart illustrating steps in the present invention method for transferring telephone calls. In step 200 a communications network includes connections between a plurality of telephones. Step 202 determines the proximity of a first telephone to a second telephone. Step 204 initiates the transfer of calls from the first telephone to the second telephone. In step 206 calls to the first telephone are accepted on the second telephone. Generally, FIG. 8 describes the transfer of calls from the first telephone to the second telephone, but the process of the present invention applies equally well to the transfer of calls from the second telephone to the first telephone.

With respect to the system illustrated in FIG. 1, in an exemplary application of FIG. 8, step 200 provides a connection between a first telephone having a wireless location receiver and a second telephone. Step 202 includes determining the proximity of the first telephone to the second telephone using a wireless receiver selected from the group consisting of GPS and short-range positioning beacon systems. Some aspects of the communications network may provide a positioning node (PN). Then, in step 202, the PN collects positional data for tracking the proximity of the first telephone to the second telephone. Alternately step 202 can include the first telephone collecting positional data for tracking its proximity to the second telephone. Obviously, step 202 can also include the second telephone tracking the proximity of the first telephone.

In some aspects of the invention, in step 200, the communications network may include a plurality of base stations. Then step 202 includes the tracking the proximity of the first telephone to the second telephone through time-of-arrival measurements made on communications received by the base stations from the first telephone. Alternately, the telephones can make time-of-arrival measurements. In some aspects of the invention step 202 includes the time of arrival proximity tracking being performed by the first telephone (and/or second telephone), in response to measurements made by the base stations. Alternately, step 202 includes the PN performing time-of-arrival proximity tracking.

In some aspects of the invention the first and second telephones may be provided with short-range transceivers. Then, step 202 includes collecting positional data for tracking the proximity of the first telephone to the second telephone through communications between the first and second telephones using the short-range transceivers. The short-range transceivers being selected from the group consisting of Bluetooth, infrared, wireless LAN, Home RF, and wireless transceiver technologies.

In some aspects of the invention the communications network may include a mobile switching center (MSC). In this case, step 202 includes the PN tracking the proximity of the first telephone to the second telephone, and step 204 includes the MSC paging the first telephone, to signal network permission for a call transfer. In step 204 the first telephone acknowledges the page, and includes the MSC automatically initiating the call transfer. Alternately, step 204 includes the first telephone acknowledging the MSC page, and includes the first telephone initiating the call transfer.

In some aspects of the invention step 202 includes the first telephone determining the proximity of itself to the second telephone, and step 204 includes the first telephone initiating the call transfer using a star feature code.

In some aspects of the communications network may include SIM cards to identify the user of a telephone. Step 204 includes initiating the call transfer by removing a SIM card from the first telephone and inserting the SIM card in the second telephone. Step 206 includes transferring a preexisting call from the first telephone to the second telephone.

In some aspects of the invention the communications network may selectably enable first and second telephones. Step 204 includes initiating the call transfer through enabling the second telephone, and step 202 includes determining the proximity of the first telephone to the second telephone after enablement of the second telephone. Alternately, step 204 includes initiating the call transfer by disabling the first telephone.

In some aspects of the invention a further step may follow step 206. Step 208 nullifies the call transfer established in step 206 and includes nullifying the call transfer in response to a stimulus selected from the group consisting of the elapse of a predetermined amount of time, the termination of a call, low power condition in the second telephone (and/or the first telephone), and poor RF coverage of the first or second telephone.

In some aspects of the invention a further step may precede step 206. Step 204a authorizes the call transfer. In this case, the communications network may provide each telephone with a non-transferable identification number, and the communications network provides an identification number cross-referenced database of permitted call transfers. Then, step 204a includes authorizing a call transfer in response to checking whether the identification number of the first telephone is cross-referenced to the identification number of the second telephones. The database can be maintained in the individual telephones or by the network. Alternately, the network may provide a first telephone user interface and step 204a may include entering a private code into the first telephone user interface to authorize the call transfer. A code can also be entered into the second telephone or both telephones. In another alternative, step 204a includes authorizing the call transfer in response to factors such as the power supply status of the first and second telephones, the RF coverage of the first and second telephones, and the capacity of the wireless cellular in which the first and second telephones are operating. Typically, the network may include, for each telephone, a presentation interface, such as a display, and step 204a includes presenting the results of the call transfer authorization process to the user of the first telephone.

Presume that the first telephone is an automobile mounted wireless telephone and the second telephone is a portable telephone. Then, step 202 includes determining that the proximity of the portable telephone to the auto-mounted telephone meets a predetermined threshold. Alternatively the portable telephone may include an embedded wireless location receiver, while the auto-mounted telephone may include a port to accept positional data. In this case, the automobile may have a wireless location receiver and a port to provide position location data. Then, step 202 includes the portable telephone collecting positioning data through the embedded wireless location receiver, and the auto-mounted telephone collecting positional data from the port of the auto-mounted wireless location receiver. Alternately, the second telephone may be a portable mobile telephone and first telephone may be an automobile mounted wireless telephone, and step 202 would include determining that the proximity of the portable telephone and the auto-mounted telephone meet a predetermined threshold.

In some aspects of the invention, the first telephone may be a portable mobile telephone and the second telephone may have a predetermined fixed position. Then, step 202 includes determining that the proximity of the portable telephone to the fixed position of the second telephone. Alternately, the first telephone may have a predetermined fixed position and the second telephone may have a wireless telephone, and step 202 includes determining that the proximity of the portable telephone to the fixed position of the first telephone.

A system and method of automatically initiating a call transfer between telephones, based on the proximity of the telephones has been provided. Location information reselecting the telephone may be collected by the telephones or by the network. Likewise proximity determination and the decision to initiate the call transfer can be made at the level of the individual telephones or by the network. Finally, security procedures can be implemented at the telephone level or at the network level. Other embodiments and variations of the invention will occur to those skilled in the art.

What is claimed is:

1. A method for transferring telephone calls, the method comprising:
    determining, at one of a first telephone and a second telephone, that the proximity of the first telephone to the second telephone is within a predetermined proximity threshold, wherein the first telephone and the second telephone each comprise a short-range transceiver, and the proximity is determined through communications between the first and second telephones using the short-range transceivers;
    initiating, at one of the first telephone and the second telephone, a transfer of calls intended for the first telephone from the first telephone to the second telephone, the initiation being made automatically in response to the proximity being within the proximity threshold; and
    nullifying, at one of the first telephone and the second telephone, the transfer of calls when the first telephone and the second telephone are no longer within the proximity threshold.

2. The method of claim 1 wherein the short-range transceivers are selected from the group consisting of Bluetooth, infra-red, Home RF, wireless LAN, and radio transceivers.

3. The method of claim 1 wherein the first telephone is a portable telephone and the second telephone is a mobile telephone.

4. In a communications network connecting telephones, a system for transferring telephone calls, the system comprising:
    a first telephone communicatively linked to the communications network, the first telephone comprising a short-range transceiver;
    a second telephone communicatively linked to the communications network, the second telephone comprising a short-range transceiver; and
    a call transfer mechanism for:
        automatically transferring telephone calls intended for the first telephone from the first telephone to the second telephone in response to the proximity of the first telephone to the second telephone being within a predetermined proximity threshold, wherein the proximity of the first telephone to the second telephone is determined through communications between the first and second telephones using the short-range transceivers; and
        nullifying the transfer of calls when the first telephone and the second telephone are no longer within the proximity threshold.

5. The system of claim 4 wherein the short-range transceivers are selected from the group consisting of Bluetooth, infra-red, Home RF, wireless LAN, and radio transceivers.

6. The system of claim 4 wherein the first telephone is a portable telephone and the second telephone is a mobile telephone.

* * * * *